United States Patent
Tsai et al.

(10) Patent No.: US 8,549,012 B2
(45) Date of Patent: Oct. 1, 2013

(54) PROCESSING EXCEPTION HANDLING

(75) Inventors: Po-Feng Tsai, Taipei (TW); Jin-Ning Sung, Pingjhen (TW); Yen-Di Tsen, Chung-Ho (TW); Jo Fei Wang, Hsin-Chu (TW); Jong-I Mou, Hsinpu Township (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 176 days.

(21) Appl. No.: 12/778,855

(22) Filed: May 12, 2010

(65) Prior Publication Data
US 2011/0282885 A1    Nov. 17, 2011

(51) Int. Cl.
*G06F 7/00*   (2006.01)
*G06F 17/30*  (2006.01)

(52) U.S. Cl.
CPC .. *G06F 7/00* (2013.01); *G06F 17/30* (2013.01)
USPC ............................. 707/748; 707/751; 707/754

(58) Field of Classification Search
None
See application file for complete search history.

(56) References Cited

U.S. PATENT DOCUMENTS

| | | | |
|---|---|---|---|
| 6,263,255 B1 | 7/2001 | Tan et al. | |
| 6,546,508 B1 | 4/2003 | Sonderman et al. | |
| 6,560,776 B1* | 5/2003 | Breggin et al. | 717/176 |
| 2003/0040830 A1* | 2/2003 | Parikh et al. | 700/121 |
| 2007/0239700 A1* | 10/2007 | Ramachandran | 707/5 |
| 2008/0233662 A1 | 9/2008 | Shen et al. | |

OTHER PUBLICATIONS

Igor Trubin, Ph.D., "Global and Application Levels Exception Detection System, Based on MASF Technique", Proceedings of the Computer Measurement Group, 2002.*
Kevin McLaughlin and Igor Trubin, "Exception Detection System, Based on the Statistical Process Control Concept", Proceedings of the Computer Measurement Group, 2001.*

* cited by examiner

*Primary Examiner* — Jay Morrison
(74) *Attorney, Agent, or Firm* — Slater & Matsil, L.L.P.

(57) ABSTRACT

In accordance with an embodiment, a method for exception handling comprises accessing an exception type for an exception, filtering historical data based on at least one defined criterion to provide a data train comprising data sets, assigning a weight to each data set, and providing a current control parameter. The data sets each comprise a historical condition and a historical control parameter, and the weight assigned to each data set is based on each historical condition. The current control parameter is provided using the weight and the historical control parameter for each data set.

18 Claims, 3 Drawing Sheets

PROCESSING EXCEPTION HANDLING

TECHNICAL FIELD

The present disclosure relates generally to semiconductor processing and, more particularly, to a system and method for exception handling during semiconductor processing.

BACKGROUND

Typically, exceptions in semiconductor processing are regular occurrences. Exceptions may be events that interrupt the normal control flows of the process control system. Examples of these exceptions may be new tape out (NTO), long-time-no-run (LTNR), periodic maintenance (PM), new chamber release, and the like. The impacts of exceptions may result in mismatched parameters of the process controllers from the actual state of the tools or processes. These impacts are generally unaccounted for in the modeling or are typically very difficult to model in the normal control algorithms.

In an attempt to remedy any mismatched parameters, engineers would typically enter control parameters after an exception occurred. The parameters that an engineer would enter were generally determined based on the engineer's experience and judgment. Because of this factor, results from processing after an exception could vary greatly. Also, there is usually some added variation that would occur between different engineers, particularly between an engineer with a high level of experience and a relatively junior engineer.

Further, the handling of the exception generally requires a relatively large amount of time when performed manually by engineers. A determination by an engineer of proper control parameters may take hours. This, in turn, may result in a large maintenance load and reduced productivity. Accordingly, there is a need in the art to overcome these deficiencies.

SUMMARY

In accordance with an embodiment, a method for exception handling comprises accessing an exception type for an exception, filtering historical data based on at least one defined criterion to provide a data train comprising data sets, assigning a weight to each data set, and providing a current control parameter. The data sets each comprise a historical condition and a historical control parameter, and the weight assigned to each data set is based on each historical condition. The current control parameter is provided using the weight and the historical control parameter for each data set.

Another embodiment is a computer program product for providing a processing control parameter. The computer program product has a medium with a computer program embodied thereon. The computer program comprises computer program code for filtering historical data when an exception occurs to provide a data train comprising data sets, the data sets each comprising a historical condition and a historical parameter; computer program code for assigning a weight to each data set based on a statistical analysis of the data train; and computer program code for determining a suggested control parameter based on the weights.

A further embodiment is a method for processing control exception handling. The method comprises determining an exception type when an exception occurs; initiating one filter of a plurality of filters and one weighting calculator of a plurality of weighting calculators based on the exception type; filtering historical data by the one filter to provide a data train, the data train comprising data sets, each of the data sets including a historical condition and a historical parameter; and providing a suggested parameter based on the historical parameter for each respective data set and on a weight of each data set determined by the one weighting calculator.

BRIEF DESCRIPTION OF THE DRAWINGS

For a more complete understanding of the present embodiments, and the advantages thereof, reference is now made to the following descriptions taken in conjunction with the accompanying drawings, in which.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Embodiments will be described with respect to a specific context, namely an intelligent manufacturing process control system for exception handling that interfaces with an advance process control (APC) system. Other embodiments may also be applied, however, to other situations beyond exception handling and to other process control systems.

Figure 1:
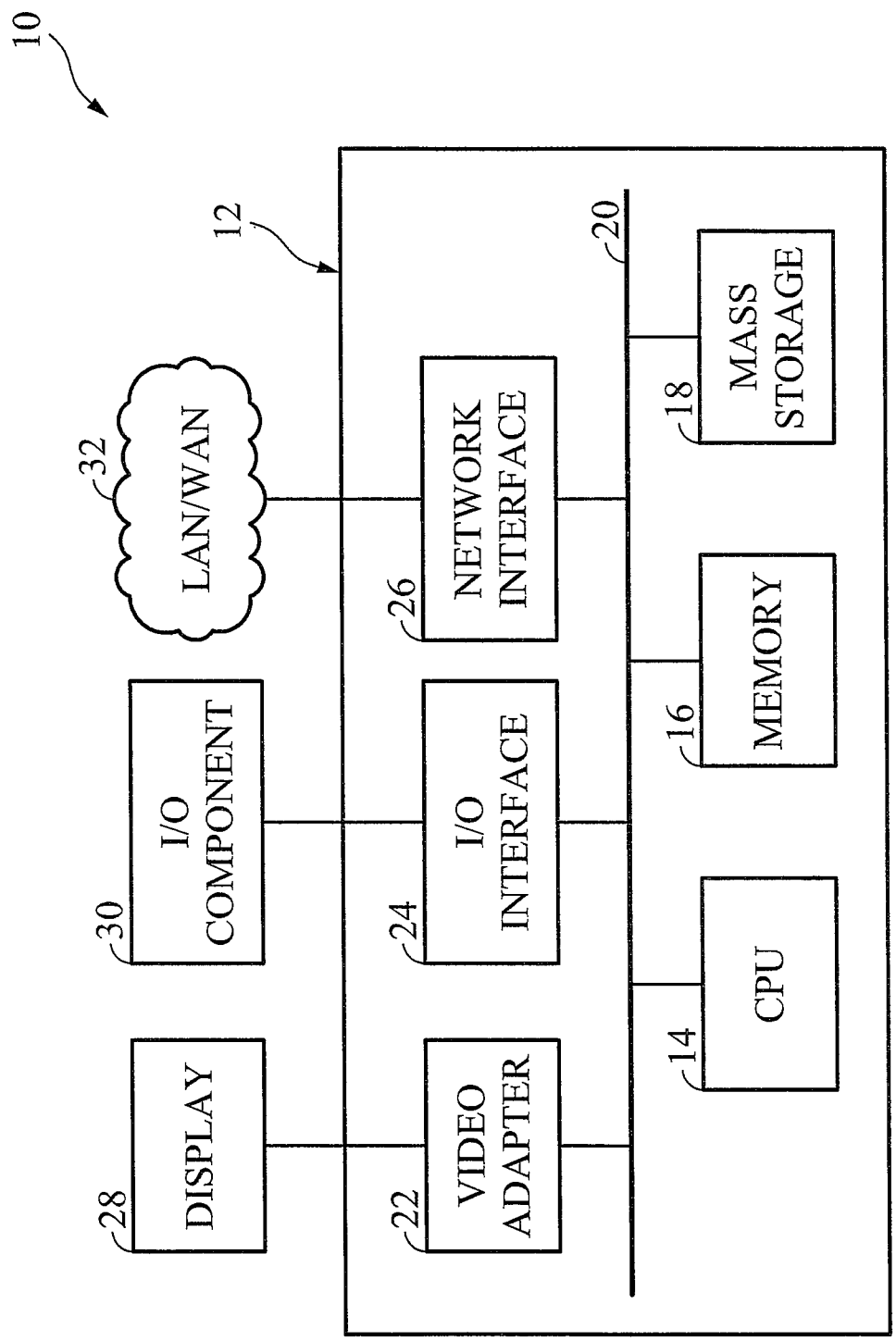
FIG. 1 is a block diagram of a processor based system in accordance with an embodiment.

Referring now to FIG. 1, a block diagram of a processor based system 10 is provided in accordance with an embodiment. The processor based system 10 is a general purpose computer platform and may be used to implement any or all of the processes discussed herein. The processor based system 10 may comprise a processing unit 12, such as a desktop computer, a workstation, a laptop computer, or a dedicated unit customized for a particular application. The processor based system 10 may be equipped with a display 28 and one or more input/output devices 30, such as a mouse, a keyboard, or printer. The processing unit 12 may include a central processing unit (CPU) 14, memory 16, a mass storage device 18, a video adapter 22, and an I/O interface 24 connected to a bus 20.

The bus 20 may be one or more of any type of several bus architectures including a memory bus or memory controller, a peripheral bus, or video bus. The CPU 14 may comprise any type of electronic data processor, and the memory 16 may comprise any type of system memory, such as static random access memory (SRAM), dynamic random access memory (DRAM), or read-only memory (ROM).

The mass storage device 18 may comprise any type of storage device configured to store data, programs, and other information and to make the data, programs, and other information accessible via the bus 20. The mass storage device 18 may comprise, for example, one or more of a hard disk drive, a magnetic disk drive, or an optical disk drive.

The video adapter 22 and the I/O interface 22 provide interfaces to couple external input and output devices to the processing unit 12. As illustrated in FIG. 1, examples of input and output devices include the display 28 coupled to the video adapter 22 and the I/O device 30, such as a mouse, keyboard, printer, and the like, coupled to the I/O interface 24. Other devices may be coupled to the processing unit 12, and additional or fewer interface cards may be utilized. For example, a serial interface card (not shown) may be used to provide a serial interface for a printer. The processing unit 12 also may include a network interface 26 that may be a wired link to a local area network (LAN) or a wide area network (WAN) 32 and/or a wireless link.

It should be noted that the processor based system 10 may include other components. For example, the processor based system 10 may include power supplies, cables, a motherboard, removable storage media, cases, and the like. These other components, although not shown, are considered part of the processor based system 10.

Embodiments may be implemented on the processor based system 10, such as by program code executed by the CPU 14. Some possible implementations of embodiments are discussed herein, but a person having ordinary skill in the art will readily understand the application of the below described processes in the processor based system 12.

Figure 2:
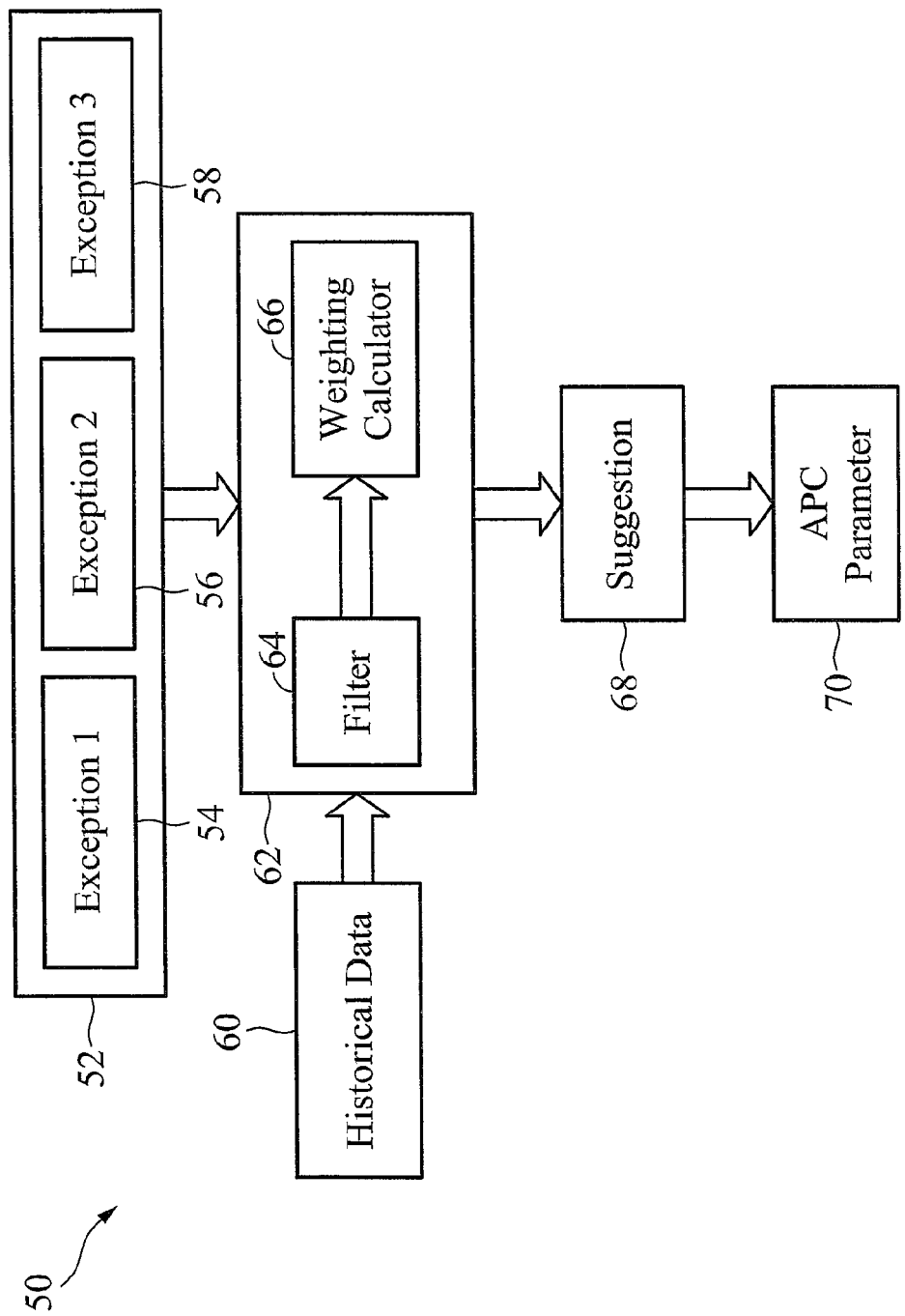
FIG. 2 is a flowchart for an intelligent manufacturing process control assurance (IMPCA) system according to an embodiment.

FIG. 2 illustrates a flowchart for an intelligent manufacturing process control assurance (IMPCA) system 50 according to an embodiment. The IMPCA 50 comprises a scenario function 52 to trigger the operation of the IMPCA 50 and to determine an exception type. FIG. 2 shows the scenario function 52 to provide a first exception 54, a second exception 56, and a third exception 58. However, the scenario function 52 may accommodate any number of exception types, and the three shown are only for illustrative purposes. Examples of exceptions are new tape out (NTO), long-time-no-run (LTNR), periodic maintenance (PM), new chamber release, and the like.

The exception type is determined by the scenario function 52 and then provided to kernel 62 from the scenario function 52. The scenario function 52 may be implemented in a number of ways. For example, the scenario function 52 may be implemented on a processor based system, such as processor based system 10 in FIG. 1. The scenario function 52 may be program code executed on the CPU 14. The program code may be saved on memory 16 or mass storage 18 or may be accessed remotely through the network interface 26. Any information necessary to the operation of the scenario function 52 may be provided through a network, such as the LAN/WAN 32 and network interface 26, manually through I/O component 30 and I/O interface 24, or communication along bus 20 such as if an additional processor is used as a separate platform within the processor based system 10. How the scenario function 52 is implemented may determine how the exception type is provided to the kernel 62. For example, if the scenario function 52 is implemented on the same processor based system, the exception type may be saved in the memory 16 for later access through the bus 20 when the CPU 14 implements the kernel 62. Other methods may include providing the exception type remotely through the LAN/WAN 32 and network interface 26 or by manually inputting the exception type through the I/O component 30 and I/O interface 24. The exception type may be saved in memory 16 or mass storage 18 for later access.

The scenario function 52 may also provide to the kernel 62 current conditions and configurations that correspond to the determined exception type, such as the criteria of collecting raw data set, setting filters, and initializing weight calculators. For example, historical data may be collected that are marked as NTO and happened within 30 days, a pattern density filter may be set with a limited range of 0.1, and only a similarity weight calculator may be activated for use (the others may be disabled). The current conditions and configurations may similarly be saved in memory 16 or mass storage 18 for later access.

The kernel 62 comprises a filter 64 and a weighting calculator 66. Similar to the scenario function 52, the kernel 62 may be implemented on a processor based system, such as processor based system 10 in FIG. 1. The kernel 62 may be integrated on the same processor based system as the scenario function 52, or may be implemented on a separate processor based system. The kernel 62 may be program code executed on the CPU 14. The program code may be saved on memory 16 or mass storage 18 or may be accessed remotely through the network interface 26. The kernel 62 may access the exception type and/or current conditions in any number of ways, like those discussed above. The filter 64 and weighting calculator 66 may be implemented together as an integrated program or may be separate functions. Also, the kernel 62 may be independent from the control system or may be integrated into the control system.

The kernel 62 may comprise multiple filters and weighting calculators that are triggered by different exception types. For example, one filter and one weighting calculator may be desirable for a NTO exception, but not for a PM exception. Accordingly, another filter and weighting calculator may be used for the PM exception. Embodiments have no limitation on the number of filters and weighting calculators.

The filter 64 accesses historical data 60 and filters the historical data 60 based on a defined criterion or set of criteria to provide a data train to the weighting calculator 66. The historical data 60 may be any set of data compiled from previous exception events. The historical data 60 may include the type of exception, the time of the event, any processing conditions, the result of the processing, control parameters, and the like. The historical data 60 may be saved as an array in a remote database that is accessible through the LAN/WAN 32 and the network interface 26, in the memory 16 or mass storage 18, or any other suitable device. Note that there is no limit to the type or amount of data saved as the historical data 60. The filter 64 may be computer program code executed by the CPU 14 and may remove irrelevant or undesirable data from what is provided to the weighting calculator 66. The filter 64 may be case, module, and/or experienced based and may be a design choice by a programmer. Examples of possible criteria for a filter are a specified target range of the processing, a recipe, a particular product, technology node, time period, and the like. Any set of historical data 60 that fails to meet the criterion or criteria defined by the filter is not passed to the weighting calculator 66. Note that a single criterion or any combination of criteria may be used in the filter. The data train that passes through the filter 64 to be provided to the weighting calculator 66 may be saved in the memory 16 or mass storage 18 in the processor based system 10 for later access by the CPU 14 when the weighting calculator 66 is executed.

The weighting calculator 66 assigns a weight to each data set within the data train to output a suggestion 68. Note that "data set" as used herein refers to all of the historical data relating to a single event, and that "data train" may comprise multiple data sets after the historical data is filtered. The weighting calculator 66 may also be computer program code executed on the CPU 14 and may access data train at any point during the execution.

The weighting calculator 66 may be a statistical analysis of the data train to determine the suggestion 68. The weighting calculator 66 may provide a weight for each data set. Then, the weights for all of the data sets in the data train may be normalized to provide normalized weights. The parameter of each data set corresponding to the parameter for the suggestion 68 may then be multiplied by the corresponding data set's normalized weight. The products of all of the data sets' parameter and normalized weight may then be summed together to provide the suggestion 68. The suggestion 68 is output to the APC parameter 70. How the suggestion 68 is output may depend on how the kernel 62 and the APC system are implemented. The kernel 62 may be implemented in the same processor based system 10 as the APC system, and thus, the suggestion 68 may be saved in memory 16 or mass storage 18 for later access by the APC system. Further, the APC system may be a separate processor based system, and the suggestion 68 may be communicated through the LAN/WAN 32 and network interface 26. How the suggestion 68 is provided to the APC system is not limited to these two examples, and a person having ordinary skill in the art will readily understand other means by which this is accomplished.

The weight assigned to each data set may be accomplished in any number of ways. Some examples of how the weights may be assigned are by using similarity weighting, performance weighting, time weighting, and any combination of these ways. A similarity weighting scheme may be based on inputs and may include a normal distribution based weighting function. A performance weighting scheme may be based on outputs and may include a linear function of the APC performance. A time weighting scheme may be based on the time of the events and may include an exponential distribution based weighting function.

The following examples may clarify these illustrative schemes. First, assume the data train (Data Set No. 1-3) and the Current Data Set shown in Table 1 is provided to the weighting calculator 66 from the filter 64 and from the scenario function 52, respectively.

TABLE 1

| Data Set No. | Time | Condition 1 | Condition 2 | Target | Post Measurement | APC Parameter |
|---|---|---|---|---|---|---|
| 1 | 0.2 | 2 | 0.3 | 100 | 98 | 3.2 |
| 2 | 0.3 | 0.7 | 1.1 | 100 | 101 | 2.6 |
| 3 | 0.4 | 1 | 0.8 | 100 | 105 | 2.3 |
| Current | 0.5 | 1.5 | 0.5 | 100 | ? | ? |

Similarity weighting may include using a multivariate normal distribution to calculate the weight to be assigned to each data set. A random vector $X=[X_1 \ldots X_k]^T$ may be defined where each condition is a random variable, and each random variable comprises n number of instances. An expected value vector $\mu=[\mu_1 \ldots \mu_k]^T$ may be defined where the variable $\mu_i$ is the expected value of random variable $X_i$, i.e. $\mu_i=E[X_i]$. In this example, k=2; $X_1$ is defined by condition 1; $X_2$ is defined by condition 2, and each random variable has n=3. The number of random variables $X_k$ may depend on the number of conditions used in the analysis, and may be one or more without limit. Then, the variance matrix $\Sigma_X$ is calculated. Calculation of the variance matrix $\Sigma_X$ is known in the art, but the equation is identified herein as Equation (1) for ease of reference.

In this example, the variance matrix $\Sigma_X$ is as follows:

$$\Sigma_X = \begin{bmatrix} 0.46 & 0 \\ 0 & 0.16 \end{bmatrix}.$$

With these definitions and information, a similarity weight may be assigned to each of n instances of random vector X, i.e. each data set in the data train. A probability density function (PDF) may be used to assign each weight in a similarity vector $\omega_S$, where $\omega_S=[\omega_{S,1} \ldots \omega_{S,n}]^T$, particularly a Gaussian normal distribution, such as shown in Equation (2) below.

$$\omega_S = f_X(X) = \frac{1}{(2\pi)^{k/2}\sqrt{|\Sigma_X|}} e^{-\frac{1}{2}(X-\mu)^T \Sigma_X^{-1}(X-\mu)} \quad \text{Eq. (2)}$$

Using the information provided above in this example, the similarity vector $\omega_S$ may be solved to provide $$\omega_S = \begin{bmatrix} 0.39 \\ 0.10 \\ 0.34 \end{bmatrix}.$$

The similarity vector $\omega_S$ may be normalized to obtain a normalized similarity vector $\overline{\omega}_S=[\overline{\omega}_{S,1} \ldots \overline{\omega}_{S,n}]^T$. The normalized weights $\overline{\omega}_{S,i}$ may be obtained by Equation (3) below.

$$\overline{\omega}_{S,i} = \frac{\omega_{S,i}}{\sum_{j=1}^{n} \omega_{S,j}} \quad \text{Eq. (3)}$$

Once the normalized similarity vector $\overline{\omega}_S$ is obtained, a suggested APC parameter $P_{Sug}$ may be determined. The suggest APC parameter $P_{Sug}$ may be determined by taking the dot product of the normalized similarity vector $\overline{\omega}_S$ and the APC parameter vector P formed from the APC parameters for the n number of instances, i.e. $P=[P_1 \ldots P_n]^T$, such that $P_{Sug}=\overline{\omega}_S \cdot P$. Accordingly, in this example, the suggest APC parameter is $P_{Sug}=(0.47)(3.2)+(0.12)(2.6)+(0.41)(2.3)=2.76$.

Time weighting may include using an exponential distribution. A time vector T may comprise the time period from the current time for each of n number of instances, i.e. each data set in data train. The time vector T may be described as $T=[t_1 \ldots t_n]^T$. An exponential distribution may be used to $$\Sigma_X = \begin{bmatrix} E[(X_1-\mu_1)(X_1-\mu_1)] & 0 & \cdots & 0 \\ 0 & E[(X_2-\mu_2)(X_2-\mu_2)] & \cdots & 0 \\ \vdots & \vdots & \ddots & \vdots \\ 0 & 0 & \cdots & E[(X_k-\mu_k)(X_k-\mu_k)] \end{bmatrix} \quad \text{Eq. (1)}$$

assign each weight in a time weight vector $\omega_T$, where $\omega_T = [\omega_{T,1} \ldots \omega_{T,n}]^T$, such as shown in Equation (4) below.

$$\omega_T = f(T; \lambda) = \begin{cases} \lambda e^{-\lambda T} & t_i \geq 0 \\ 0 & t_i < 0 \end{cases} \quad \text{Eq. (4)}$$

The decay factor $\lambda$ may be set at any value and is a design choice. Using the information provided above in this example with $\lambda=1$, the time weight vector $\omega_T$ may be solved to provide $$\omega_T = \begin{bmatrix} 0.74 \\ 0.82 \\ 0.90 \end{bmatrix}.$$

The time weight vector $\omega_T$ may be normalized to obtain a normalized time vector $\overline{\omega}_T = [\overline{\omega}_{T,1} \ldots \overline{\omega}_{T,n}]^T$. The normalized weights $\overline{\omega}_{T,i}$ may be obtained by Equation (5) below.

$$\overline{\omega}_{T,i} = \frac{\omega_{T,i}}{\sum_{j=1}^{n} \omega_{T,j}} \quad \text{Eq. (5)}$$

Once the normalized time vector $\overline{\omega}_T$ is obtained, a suggested APC parameter $P_{Sug}$ may be determined. The suggest APC parameter $P_{Sug}$ may be determined by taking the dot product of the normalized time vector $\overline{\omega}_T$ and the APC parameter vector P formed from the APC parameters for the n number of instances, i.e. $P=[P_1 \ldots P_n]^T$, such that $P_{Sug}=\overline{\omega}_T \cdot P$. Accordingly, in this example, the suggest APC parameter $P_{Sug}=2.67$.

Performance weighting may include using a linear function. A difference vector D may comprise magnitudes of the difference between the target and the post measurement for each of n number of instances, i.e. each data set in data train. It should be noted that the difference may not be a magnitude but the actual signed difference in some instances. One example may be when the concerned process or chamber is for a chemical mechanical polish (CMP), where a negative value indicates that the polishing has removed less than the target, as opposed to removing more than the target depth. The difference vector D may be described as $D=[d_1 \ldots d_n]^T$. A linear function may be used to assign each weight in a performance weight vector $\omega_P$, where $\omega_P=[\omega_{P,1} \ldots \omega_{P,n}]^T$, such as shown in Equation (6) below.

$$\omega_P = f(D; a; b) = \begin{cases} aD+b & q < d_i < r \\ 0 & q > d_i; d_i > r \end{cases} \quad \text{Eq. (6)}$$

The coefficients a and b are case dependent upon various considerations, such as process sensitivity and control safety. In this example, a=2 and b=0. Further, q and r are lower and upper weighting boundaries as defined by the control specification. In this example, any performance difference $d_i$ not within the range q to r will be assigned a weight of zero. Further note that these boundaries may change depending on the processes to which these weights are being applied. In some instances, for example a CMP, it may be desirable to have a third definition for a range where a performance difference $d_i$ is within a particular negative range. Using the information provided above in this example, the performance weight vector $\omega_P$ may be solved to provide $$\omega_P = \begin{bmatrix} 4 \\ 2 \\ 10 \end{bmatrix}.$$

The performance weight vector $\omega_P$ may be normalized to obtain a normalized performance vector $\overline{\omega}_P=[\overline{\omega}_{P,1} \ldots \overline{\omega}_{P,n}]^T$. The normalized weights $\overline{\omega}_{P,i}$ may be obtained by Equation (7) below.

$$\overline{\omega}_{P,i} = \frac{\omega_{P,i}}{\sum_{j=1}^{n} \omega_{P,j}} \quad \text{Eq. (7)}$$

Once the normalized performance vector $\overline{\omega}_P$ is obtained, a suggested APC parameter $P_{Sug}$ may be determined. The suggest APC parameter $P_{Sug}$ may be determined by taking the dot product of the normalized performance vector $\overline{\omega}_P$ and the APC parameter vector P formed from the APC parameters for the n number of instances, i.e. $P=[P_1 \ldots P_n]^T$, such that $P_{Sug}=\overline{\omega}_P \cdot P$. Accordingly, in this example, the suggest APC parameter $P_{Sug}=2.56$.

Even further, any different weighting schemes that are used may be combined in any manner to determine the suggested APC parameter $P_{Sug}$. For example, the similarity weighting, the time weighting, and/or the performance weighting may be combined in any manner. This may be achieved by multiplying corresponding entries of the normalized similarity vector $\overline{\omega}_S$, the normalized time vector $\overline{\omega}_T$ and/or the normalized performance vector $\overline{\omega}_P$ to obtain entries for a combined weight vector $\omega_C$. For example, if all three weight vectors are combined, the combined weight vector $\omega_C$ may be obtained by Equation (8) below.

$$\omega_C = \begin{bmatrix} \omega_{C,1} \\ \vdots \\ \omega_{C,n} \end{bmatrix} = \begin{bmatrix} \overline{\omega}_{S,1} \overline{\omega}_{T,1} \overline{\omega}_{P,1} \\ \vdots \\ \overline{\omega}_{S,n} \overline{\omega}_{T,n} \overline{\omega}_{P,n} \end{bmatrix} \quad \text{Eq. (8)}$$

Also, any two normalized weight vectors may be multiplied to determine the weight vector $\omega_C$.

The combined weight vector $\omega_C$ may be normalized to obtain a normalized combined vector $\overline{\omega}_C=[\overline{\omega}_{C,1} \ldots \overline{\omega}_{C,n}]^T$. The normalized weights $\overline{\omega}_{C,i}$ may be obtained by Equation (9) below.

$$\overline{\omega}_{C,i} = \frac{\omega_{C,i}}{\sum_{j=1}^{n} \omega_{C,j}} \quad \text{Eq. (9)}$$

Once the normalized combined vector $\overline{\omega}_C$ is obtained, a suggested APC parameter $P_{Sug}$ may be determined. The suggest APC parameter $P_{Sug}$ may be determined by taking the dot product of the normalized combined vector $\overline{\omega}_C$ and the APC parameter vector P formed from the APC parameters for the n number of instances, i.e. $P=[P_1 \ldots P_n]^T$, such that $P_{Sug}=\overline{\omega}_C \cdot P$.

Using the normalized weighting vectors in the above examples, the following Table 2 may summarize the normalized weighting vectors, the combined weighting vector $\omega_C$, and the normalized combined vector $\overline{\omega}_C$.

TABLE 2

| Data Set No. | $\bar{\omega}_S$ | $\bar{\omega}_T$ | $\bar{\omega}_P$ | $\omega_C$ | $\bar{\omega}_C$ | APC Parameter |
|---|---|---|---|---|---|---|
| 1 | 0.47 | 0.30 | 0.25 | 0.04 | 0.26 | 3.20 |
| 2 | 0.12 | 0.33 | 0.13 | 0.01 | 0.04 | 2.60 |
| 3 | 0.41 | 0.37 | 0.63 | 0.1 | 0.70 | 2.30 |

Taking the dot product of the APC parameter vector P and the normalized combined vector $\bar{\omega}_C$, the outputted suggested APC parameter $P_{Sug}$ may be 2.55.

Figure 3:
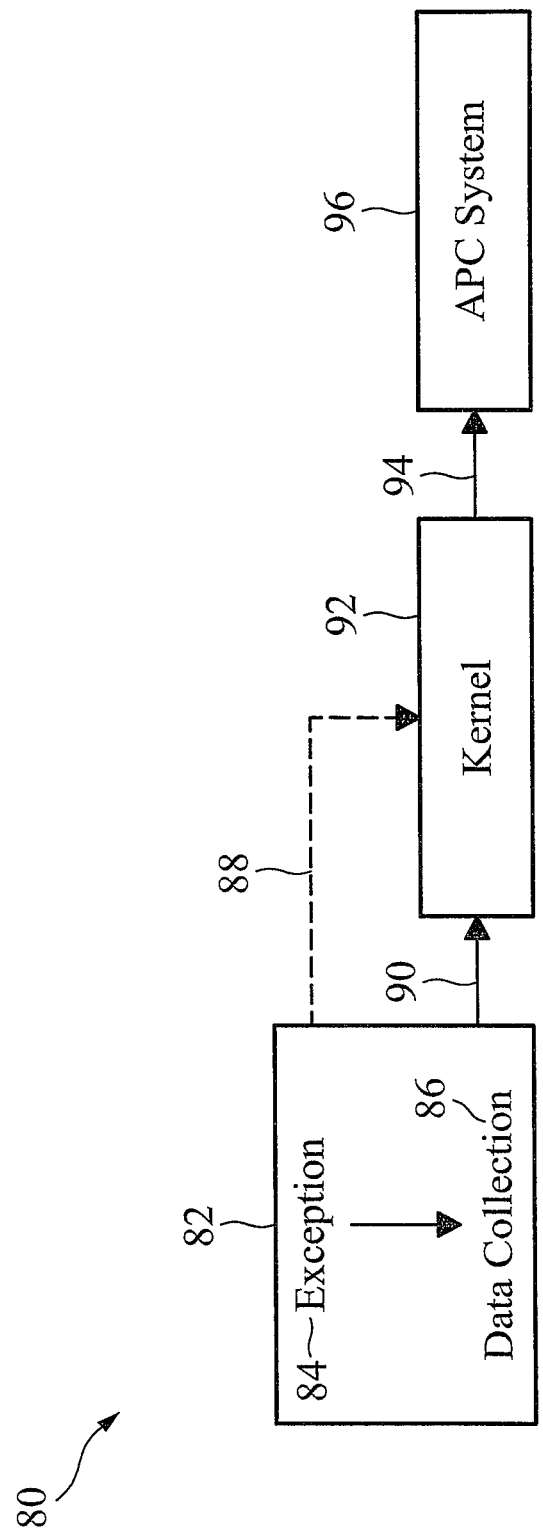
FIG. 3 is a generalized workflow of an embodiment.

FIG. 3 illustrates a generalized workflow 80 of an embodiment. Scenario function 82 detects the exception 84 and begins data collection 86, both current and historical data. The scenario function 82 also triggers 88 the kernel 92 to begin operation and provides data 90 for access by the kernel 92. The kernel 92 uses processes such as filters and weighting calculators to determine a suggested APC parameter 94 that is output to the APC system 96. These functions may be carried out by program code that is executed on one or multiple processor based systems, and if more than one processor based system is used, the systems may be interconnected by various networks.

Embodiments may achieve advantages over known processes. Embodiments may achieve reduced maintenance loading and reduced calculation time when determining control parameters, as compared to known processes. For example, embodiments may reduce the time required to calculate a parameter from hours to seconds, such as from five hours to ten seconds. Also, embodiments may achieve improved deviations between products. For example, the inventors have experimented with embodiments and have found that for a polysilicon deposition process in an APC system, the coverage rate improved on average approximately 30 percent. The turn rate improved approximately 14 to 32 percent, and the Q-time gain was approximately 24 to 46 percent. Also, the operation rate improved from approximately 35 to 1.5 percent, a 96 percent improvement.

Although the present embodiments and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for exception handling, the method comprising:
    accessing an exception type for an exception occurring for a manufacturing process, the exception interrupting a control flow of a process control system of the manufacturing process;
    filtering historical data of the manufacturing process, the filtering further comprising determining which of a plurality of filters to perform the filtering based upon the exception type, the filtering being based on at least one defined criterion to provide a data train comprising data sets, wherein the data sets each comprise a historical condition of the manufacturing process and a historical control parameter of the manufacturing process;
    assigning a weight to each data set based on each historical condition, the assigning the weight comprising determining which of a plurality of weighting calculators to perform the assigning the weight; and
    using a processor, providing a current control parameter for the manufacturing process, the current control parameter corresponding to the historical control parameter in type, the providing the current control parameter using the weight and the historical control parameter for each data set, the current control parameter to be used by a manufacturing tool to control an operation of the manufacturing process.

2. The method of claim 1, wherein the assigning the weight to each data set comprises a statistical analysis using the historical condition of each data set.

3. The method of claim 2, wherein the statistical analysis includes using a similarity weighting analysis that comprises a Gaussian normal distribution, and wherein the historical condition comprises a processing condition.

4. The method of claim 2, wherein the statistical analysis includes using a time weighting analysis that comprises an exponential decay function, and wherein the historical condition comprises a difference of a historical time corresponding to each data set from a current time corresponding to the exception.

5. The method of claim 2, wherein the statistical analysis includes using a performance weighting analysis that comprises a linear function, and wherein the historical condition comprises a difference of a performance target from a performance measurement.

6. The method of claim 1, wherein the accessing the exception type comprises determining the exception type.

7. The method of claim 1, wherein a first filter based on a first at least one defined criterion is used for a first exception type, and a second filter based on a second at least one defined criterion is used for a second exception type, wherein the first filter and the first exception type are different from the second filter and the second exception type, respectively.

8. The method of claim 1, wherein the providing the current control parameter comprises multiplying the historical parameter of each data set by the weight assigned to the data set to obtain respective contributions, and summing the contributions to obtain the current control parameter.

9. A computer program product for providing a processing control parameter, the computer program product having a non-transitory medium with a computer program embodied thereon, the computer program comprising:
    computer program code for filtering historical data of a manufacturing process when an exception occurs in the manufacturing process to provide a data train comprising data sets, the computer program code for filtering comprising computer program code for determining which one of a plurality of filters for performing the filtering will be initiated based upon an exception type of the exception, the exception interrupting a control flow of a process control system of the manufacturing process, the data sets each comprising a historical condition of the manufacturing process and a historical parameter of the manufacturing process, the computer program code for filtering accessing the historical data from a storage medium;

computer program code for assigning a weight to each data set based on a statistical analysis of the data train, the computer program code for assigning the weight comprising computer program code for determining which one of a plurality of weighting calculators for performing the assigning of the weight to each data set will be initiated; and computer program code for determining a suggested control parameter based on the weights, the suggested control parameter corresponding in type to the historical parameter and to be used by a manufacturing tool to control an operation of the manufacturing process.

10. The computer program product of claim 9, wherein the computer program further comprises computer program code for determining the exception type when the exception occurs.

11. The computer program product of claim 9, wherein the computer program further comprises computer program code for outputting the suggested control parameter.

12. The computer program product of claim 9, wherein the statistical analysis comprises a Gaussian normal distribution using the historical condition.

13. The computer program product of claim 9, wherein the statistical analysis comprises an exponential decay function based on the historical condition, wherein the historical condition comprises a difference between a current time of the exception and a historical time corresponding to each respective data set.

14. The computer program product of claim 9, wherein the statistical analysis comprises a linear function based on the historical condition, wherein the historical condition comprises a difference between a performance target and a performance measurement.

15. A method for processing control exception handling, the method comprising:

determining an exception type when an exception occurs in a manufacturing process, the exception interrupting a control flow of a process control system of the manufacturing process;

initiating one filter of a plurality of filters and one weighting calculator of a plurality of weighting calculators based on the exception type;

filtering historical data of the manufacturing process by the one filter to provide a data train, the data train comprising data sets, each of the data sets including a historical condition of the manufacturing process and a historical parameter of the manufacturing process; and using a processor, providing a suggested parameter based on the historical parameter for each respective data set and on a weight of each data set determined by the one weighting calculator, the suggested parameter corresponding to the historical parameter in type, the suggested parameter to be used by a manufacturing tool to control an operation of the manufacturing process.

16. The method of claim 15 further comprising normalizing the weight for each data set to obtain a normalized weight for each data set.

17. The method of claim 16, wherein providing the suggested parameter comprises multiplying the normalized weight with the historical parameter of each data set to obtain parameter contributions for each data set, and summing all parameter contributions.

18. The method of claim 15, wherein the weighting calculator comprises a statistical analysis, wherein the statistical analysis comprises at least one of a Gaussian normal distribution, an exponential decay function, and a linear function.

* * * * *